United States Patent [19]
Ducret

[11] Patent Number: 4,735,117
[45] Date of Patent: Apr. 5, 1988

[54] WIRE STRIPPING PLIERS
[76] Inventor: Lucien C. Ducret, 9 Tod's Driftway, Old Greenwich, Conn. 06870
[21] Appl. No.: 920,801
[22] Filed: Oct. 17, 1986
[51] Int. Cl.$^4$ ............................................. H02G 1/12
[52] U.S. Cl. .......................................... 81/9.4; 7/107
[58] Field of Search ............... 81/9.4, 9.44; 7/129, 7/132, 107, 125; 30/90.1, 91.2

[56] References Cited
U.S. PATENT DOCUMENTS
714,109  11/1902  Henderson et al. ............... 30/91.2
924,357   6/1909  Irwin ................................ 7/107 X
3,795,023  3/1974  Miragliotta ........................ 7/107
3,928,878 12/1975  Van Heuman ..................... 7/107

Primary Examiner—Debra Meislin
Attorney, Agent, or Firm—DeLio & Associates

[57] ABSTRACT

A tool of pliers type which is modified to include stripping jaws for removing insulation from a wire, at least one of said jaws being adjustable for different wire sizes and both jaws being so mounted that they do not substantially increase the overall dimension of the pliers.

4 Claims, 2 Drawing Sheets

WIRE STRIPPING PLIERS

BACKGROUND OF THE INVENTION

This invention relates to the modification of known heavy duty pliers to include specially designed adjustable means for stripping insulation from an insulated wire.

Electricians use the squared nose side cutter plier the most. They use it to pull wires and trim wires to length. It is time consuming to reach for a separate stripping tool or knife to remove the wire's insulation to make a connection. Thus, with a pair of pliers having a built-in stripping head, the electrician can efficiently pull, trim and strip wire in one operation. This tool can be used on any wire, either solid or stranded, in a range of sizes generally from 22 to 8 AWG.

The invention is shown as being embodied in a pair of pliers having jaw portions which include gripping surfaces and cutting edges, if desired, each jaw portion being integral with a respective handle portion, the jaws and handles constituting arms said portion being cross in a pivot portion which are provided with coplanar land areas on at least one side of the tool. The two stripping jaws are mounted, one on each of said land areas in position to be opened and closed by small opening and closing movements of the pliers.

It is an object of the invention to provide a tool wherein the stripping jaws extend in a direction perpendicular to the body of the pliers so that the electrician's hand gripping the tool is parallel to the wire and can exert more force to pull off the insulation.

It is a further object of the invention to provide a tool wherein the side of the pliers' body can be used as a guide to slide the wire inside the open stripping jaw, thus automatically centering the wire between the jaws.

It is another object of the invention to provide a stripping tool wherein the jaws have a low profile which permits the pliers to be carried in a standard pouch tool holder.

It is a still further object of the invention to provide a tool having its elements so constructed and arranged that the foregoing and other objects may effectively be obtained.

BRIEF DESCRIPTION OF THE DRAWINGS

A practical embodiment of the invention is shown in the accompanying drawings wherein.

DETAILED DESCRIPTION OF THE PREFERRED EMBODIMENT

Figures 1, 2:
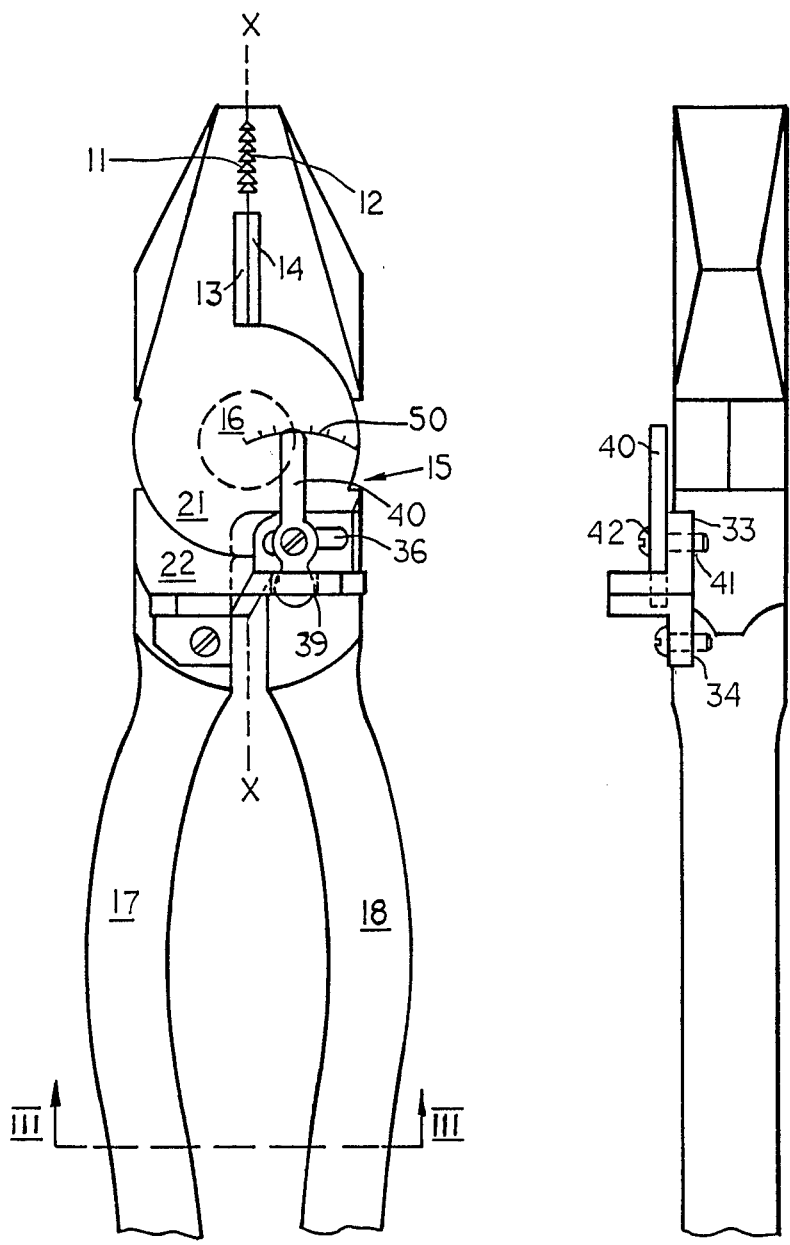
FIG. 1 represents a side elevation of the pliers in closed position, portions of the handles being cut off.
FIG. 2 represents an elevation of the pliers, viewed from the right of FIG. 1.
Figure 3:
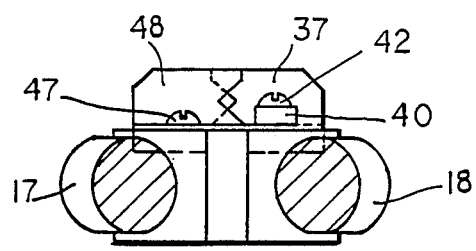
FIG. 3 represents a section on the line III—III of FIG. 1, looking in the direction of the arrows.
Figure 4:
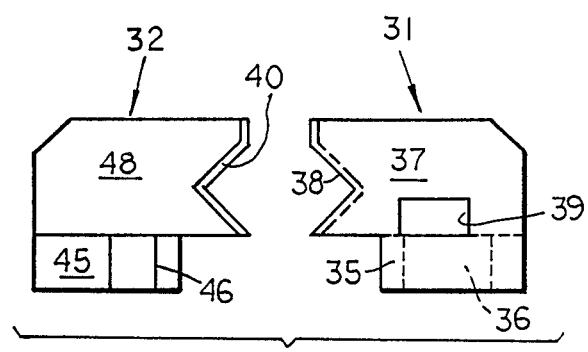
FIG. 4 represents a detail enlarged view of the stripping jaws alone.

Referring to the drawings, the pliers are of the square-nosed type with gripping surfaces 11, 12 and matching wire-cutting edges 13, 14, a pivot section 15 with pivot pin 16, and handle portions 17, 18 integral with the respective gripping surfaces 12, 11 and cutting edges 14, 13. The pivot section 15 includes a first land area 21 on one arm of the pliers integral with handle 18 and a second land area 22 is formed on an adjacent portion of the other plier arm integral with handle 17. The land areas 21 and 22 are contiguous and coplanar. The gripping surfaces 11, 12, wire-cutting edges 13, 14 and pivot pin 16 lie along the longitudinal axis X—X of the pliers.

In order to mount the stripping jaws 31, 32 on the pliers just described, a first groove 33 is milled about half-way across the first land area 21, the longitudinal axis of this groove being disposed perpendicular to the axis X—X, and a second groove 34 is milled in the forward portion of the handle 17 adjacent the land area 22. For purposes of this description the pliers are considered to be in closed position.

As shown in FIGS. 1 to 4, each stripping jaw comprises a rectangular base and an upstanding blade portion. The jaw 31 has a base 35 which is provided with an elongated slot 36 and is received slidably in the first groove 33. The jaw 31 has a blade portion 37 extending perpendicular to the plane of the land area 21. At one end of the blade 37 is the V-shaped, beveled, cutting edge 38, and the wall of the blade portion is provided with a cavity 39 to receive one end of the adjusting lever 40 (FIGS. 1 and 2). The bottom of the groove 33 is drilled and threaded at 41 to receive the locking screw 42. The adjusting lever 40 is fulcrummed on the locking srew which passes through the slot 36 and serves not only as the pivot for the lever but also, when tightened, as the lock to hold the jaw in any adjusted position, as explained below.

The jaw 32 has a base 45, bored at 46 to receive a screw 47 which holds the jaw in fixed position in the groove 34. The upstanding blade portion 48 has a V-shaped, beveled cutting edge 49 in a position to cooperate with the edge 38 on the adjustable jaw to strip a wire when the tool is operated as described below.

In operation, the locking screw 42 is loosened, if necessary, and the lever 40 is moved to a setting which is appropriate for the size of the wire to be stripped. Calibrations along the arc 50 on the surface of the land area 21 show where the lever should be set and the screw 42 is tightened to hold the lever and the adjusted stripping jaw 31 in their proper position. When the pliers are opened the stripping jaws separate and the wire can be laid in place between them, the pliers' body being used as a guide to slide the wire into the open jaws. When the jaws are closed on the wire the insulation is cut and the electrician's hand, parallel to the wire, can readily pull off the insulation to leave a cleanly stripped wire.

Figure 6:
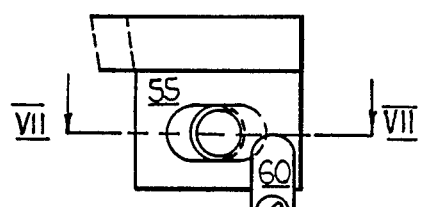
FIG. 6 represents a detail side elevation of the jaw shown in FIG. 5.
Figure 5:
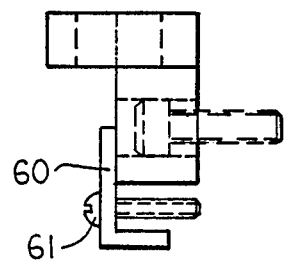
FIG. 5 represents a detail top plan view of a modified form of adjustable stripping jaw.
Figure 7:
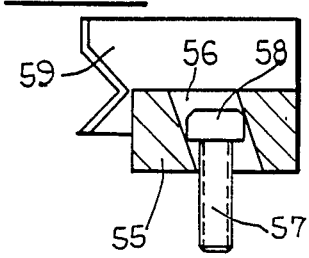
FIG. 7 represents a section on the line VII—VII of FIG. 6.
Figure 8:
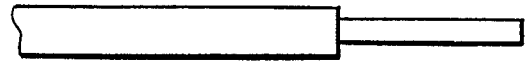
FIG. 8 represents an elevation of a wire portion, with stripped insulation.

An alternative means for adjusting the movable stripping jaw is shown in FIGS. 5, 6 and 7 where the block 35 is replaced by a block 55 which has a slightly slanting hole 56 drilled through it. A groove, such as groove 33, has a hole like that shown at 41 and a heavy screw 57 with bevel-edged head 58 is screwed into said hole. The upper and lower edges of the screw head should desirably be slanted at angles which match the wall surfaces of the hole with which they are in contact. The head of the screw fits closely in the slanting hole 56, as shown in FIG. 7, so that adjustment of the screw causes longitudinal movement of the block 55 in the groove. The block 55 carries the stripping jaw 59, like jaw 37, and the adjusted position of this jaw is stabilized by means of the clamping finger 60 when the locking screw 61, threadedly engaged in an adjacent plier arm (not shown) is tightened.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing(s) shall be interpreted as illustrative and not in a limiting sense.

What I claim is:

1. A tool of the pliers type having two arms and a pivot, the tool including an adjustable wire stripping jaw and a fixed wire stripping jaw, a first arm being provided with a land area adjacent to the pivot and adapted to support said adjustable stripping jaw and a portion of the other arm adjacent to said land area being adapted to support said fixed stripping jaw, the tool having a longitudinal axis passing through the pivot, said land area having a groove extending in a direction perpendicular to said axis and said adjustable jaw having a base slidable in said groove, a locking screw attached to said first arm and engaging said adjustable jaw for holding said adjustable jaw in its adjusted position, and a lever fulcrummed on said locking screw and engaging said adjustable jaw for moving said adjustable jaw, each said stripping jaw having a blade portion disposed perpendicularly to the plane of said land area and each blade portion having a V-shaped cutting edge at one end.

2. A tool according to claim 1 wherein the base of the adjustable jaw is provided with an elongated slot and the locking screw passes through said slot.

3. A tool of the pliers type having two arms and a pivot, the tool including an adjustable wire stripping jaw and a fixed wire stripping jaw, a first arm being provided with a land area adjacent to the pivot and adapted to support said adjustable stripping jaw and a portion of the other arm adjacent to said land area being adapted to support said fixed stripping jaw, the tool having a longitudinal axis passing through the pivot, said land area having a groove extending in a direction perpendicular to said axis and said adjustable jaw having a base slidable in said groove, means for moving said adjustable jaw and means for holding said jaw in its adjusted position, each said stripping jaw having a blade portion disposed perpendicularly to the plane of said land area and each blade portion having a V-shaped cutting edge at one end, the base of the adjustable jaw being provided with a hole slanted in the direction of desired movement of the jaw and a screw threaded into said first arm and extending within said holes to cause movement of said adjustable jaw upon rotation of said screw.

4. A tool according to claim 3 wherein the first arm is provided with a threaded hole, said screw is adapted to be screwed in and out of said threaded hole and is provided with a head engageable with the wall of said slanted hole.

* * * * *

UNITED STATES PATENT AND TRADEMARK OFFICE
CERTIFICATE OF CORRECTION

PATENT NO. : 4,735,117
DATED : Apr. 5, 1988
INVENTOR(S) : Lucien C. Ducret

It is certified that error appears in the above-identified patent and that said Letters Patent are hereby corrected as shown below:

In the Specification

In column 1, line 24, delete
"said portion being cross in a pivot portion which are" and replace with
--which cross in a pivot portion said portion being--.

Signed and Sealed this

Thirtieth Day of August, 1988

Attest:

DONALD J. QUIGG

Attesting Officer     Commissioner of Patents and Trademarks